ced Patent [19] [11] Patent Number: 5,155,402
Bichler [45] Date of Patent: Oct. 13, 1992

[54] BEARING RADIALLY AND AXIALLY SUPPORTING ROTOR OF LARGE RADIAL DIMENSIONS

[75] Inventor: Udo J. Bichler, Heidelberg, Fed. Rep. of Germany

[73] Assignee: Teldix GmbH, Heidelberg, Fed. Rep. of Germany

[21] Appl. No.: 613,496
[22] PCT Filed: Dec. 14, 1988
[86] PCT No.: PCT/EP88/01153
§ 371 Date: Dec. 6, 1990
§ 102(e) Date: Dec. 6, 1990
[87] PCT Pub. No.: WO89/12178
PCT Pub. Date: Dec. 14, 1989

[30] Foreign Application Priority Data

Jun. 6, 1988 [DE] Fed. Rep. of Germany ....... 3819205

[51] Int. Cl.$^5$ .......................... H02K 7/09; F16C 39/06
[52] U.S. Cl. .................................. 310/90.5; 318/629
[58] Field of Search ...................... 33/317 D, 321, 366; 310/90.5; 318/629, 649

[56] References Cited

U.S. PATENT DOCUMENTS

| 3,955,858 | 5/1976 | Poubeau | 310/90.5 |
| 4,040,508 | 8/1977 | Sunada et al. | 310/95 |
| 4,121,143 | 10/1978 | Habermann et al. | 310/90.5 |
| 4,143,312 | 3/1979 | Duckworth et al. | 318/649 |
| 4,294,493 | 10/1981 | Sindlinger et al. | 310/90.5 |
| 4,392,693 | 7/1983 | Habermann et al. | 310/90.5 |
| 4,839,550 | 6/1989 | Mizuno et al. | 310/90.5 |

FOREIGN PATENT DOCUMENTS

| 185765 | 7/1986 | European Pat. Off. |
| 201894 | 11/1986 | European Pat. Off. |
| 3241507 | 5/1983 | Fed. Rep. of Germany. |
| 58-42308 | 9/1984 | Japan. |
| 173179 | 3/1986 | Japan. |
| 2011658 | 7/1979 | United Kingdom. |
| 2129582 | 5/1984 | United Kingdom. |

OTHER PUBLICATIONS

Klimek, *Deutsche Luft-und Raumfahrt*, Inst. für Flugführung, Mar. 1972, 141 pp. + appendises: "Ein Beitrag Zur messtechischen Anwendung der aktiven elektromagnetischen Lagerung".

Primary Examiner—Steven L. Stephan
Assistant Examiner—D. L. Rebsch
Attorney, Agent, or Firm—Spencer, Frank & Schneider

[57] ABSTRACT

A bearing for radially and axially holding a rotor with large radial dimensions about a stator has sensors (22-25) for determining tilt angles of the rotor with respect to the stator's X and Y axes, and controllers for generating control currents in control coils (17-20) associated with the stator's X and Y axes. The generated currents depend on the output signal of the sensors and, in combination with permanent magnet rings arranged on rotor, exert moments on the rotor, influencing the tilt angles. The controllers have alternating couplers which disable the connection of the tilt axes generated by gyroscopic effects. The controllers may include proportional-derivitive controllers having a gain which is modified proportionately to the square of the speed of the rotor, and a time constant which changes in inverse proportion to the rotor's speed. The central bearing for the radial movement in the X/Y direction either acts passively as a permanent magnet, or actively, as an electromagnet. In the latter case, the parameters of the controllers can be switched from a "soft" to a "hard" operational mode and vice-versa, either to prevent unbalanced disturbances from affecting the stator, or to provide sufficient rigidity for the position control function, even in the presence of external forces.

26 Claims, 7 Drawing Sheets

BEARING RADIALLY AND AXIALLY SUPPORTING ROTOR OF LARGE RADIAL DIMENSIONS

BACKGROUND OF THE INVENTION

The invention relates to a bearing for the radial and axial support of a rotor having large radial dimensions about a stator.

DE-OS 3,243,641 discloses that mechanical bearings, and electrodynamic magnetic bearings can be employed for rotors having large radial dimensions.

This publication also discloses the control of the tilt axes of a rotor having large radial dimensions in order to, on the one hand, effectively counteract interfering moments and natural frequencies and, on the other hand, generate certain moments which, in the manner of gyroscopic moments, cause the system to swing horizontally.

DE-OS 3,240,809 discloses a magnetic bearing in which the diameter of the air gap is large compared to the axial length of the bearing. The rotor is radially passively mounted by means of permanent magnets at least on the side of the rotor, while the axial position of the rotor is actively regulated by a control device. In order to determine the axial position of the rotor, several sensor arrangements are employed as well as control amplifiers and coils which exert forces on the rotor. Four sensor arrangements are arranged in pairs diametrally to the axis of rotation on mutually perpendicular axes which are also perpendicular to the axis of rotation. Three control amplifiers are provided of which the first and second control amplifier each receive the difference between the sensor signals of diametrally opposite sensor arrangements and the third control amplifier receives the sum of all sensor output signals. The outputs of the control amplifiers are connected with windings in such a manner that actuation of the first and second amplifier causes restoring moments to act on the rotor about the axis perpendicular to the axis on which the associated sensor arrangements are disposed and actuation of the third amplifier causes an axial restoring force to act on the rotor.

Additionally the '809 reference discloses that the input signals of the first and second control amplifier are cross-coupled, that is, part of the input signal of the one amplifier is superposed on the input signal of the other amplifier.

SUMMARY OF THE INVENTION

It is the object of the invention to provide a control method and a magnetic bearing for the radial and axial support of rotors having large radial dimensions and operating over a broad range of revolutions while also being usable without problems for so-called "micro-g" environments.

This is accomplished by the the bearing for stabilizing a rotor about tilt axes of a stator according to the invention. This bearing includes sensing means, associated with the X and Y axes of the stator, for determining angles of tilt of the rotor with respect to the stator's axes and for outputting signals representing the determined tilt angles; control coils disposed on the stator and associated with the X and Y axes of the stator; and control means, connected to the outputs of the sensing means, for generating control currents in the control coils so a to generate, in connection with magnets disposed on the rotor, moments which act on the rotor influencing the determined tilt angles. The control means of the invention employs controllers which receive the determined tilt angles, and and alternating coupling means connected to the output of the controllers for cancelling the coupling of the X and Y tilt axes of the rotor caused by gyroscopic effects. The alternating coupling means has integral characteristics with time constants which are inversely proportional to the number of revolutions of the rotor.

Advantages of this invention reside in the possibility of actively and horizontally swinging the tilt axes in order to generate, without further expense, torques in the second tilt axis. The second tilt axis is perpendicular to the axis of rotation and to the actively pivoted tilt axis. The torques are generated simply by the control principle employed. Another advantage is in the use of the bearing for rotors having a low height.

Other aspects of the invention in connection with the controls resulting in particularly favorable embodiments of the bearing which, however, can also be employed for other control principles, independently of the control according to the invention. A switch is described that can be made by the monitoring circuit if a distance sensor or a control coil is faulty so that the operational capability of the bearing remains in effect after their malfunction.

The advantage of a further embodiment of the invention resides in that the control for the active central bearing is switchable. If strong radial interferences are to be expected, as they may occur during spacecraft maneuvers, a "hard" control is employed.

If, however, the bearing is operated in a "micro-g" environment, a "soft" control is preferred.

BRIEF DESCRIPTION OF THE DRAWINGS

The invention will now be described in greater detail with reference to the accompanying drawings in which.

DESCRIPTION OF THE PREFERRED EMBODIMENT

Figure 1:
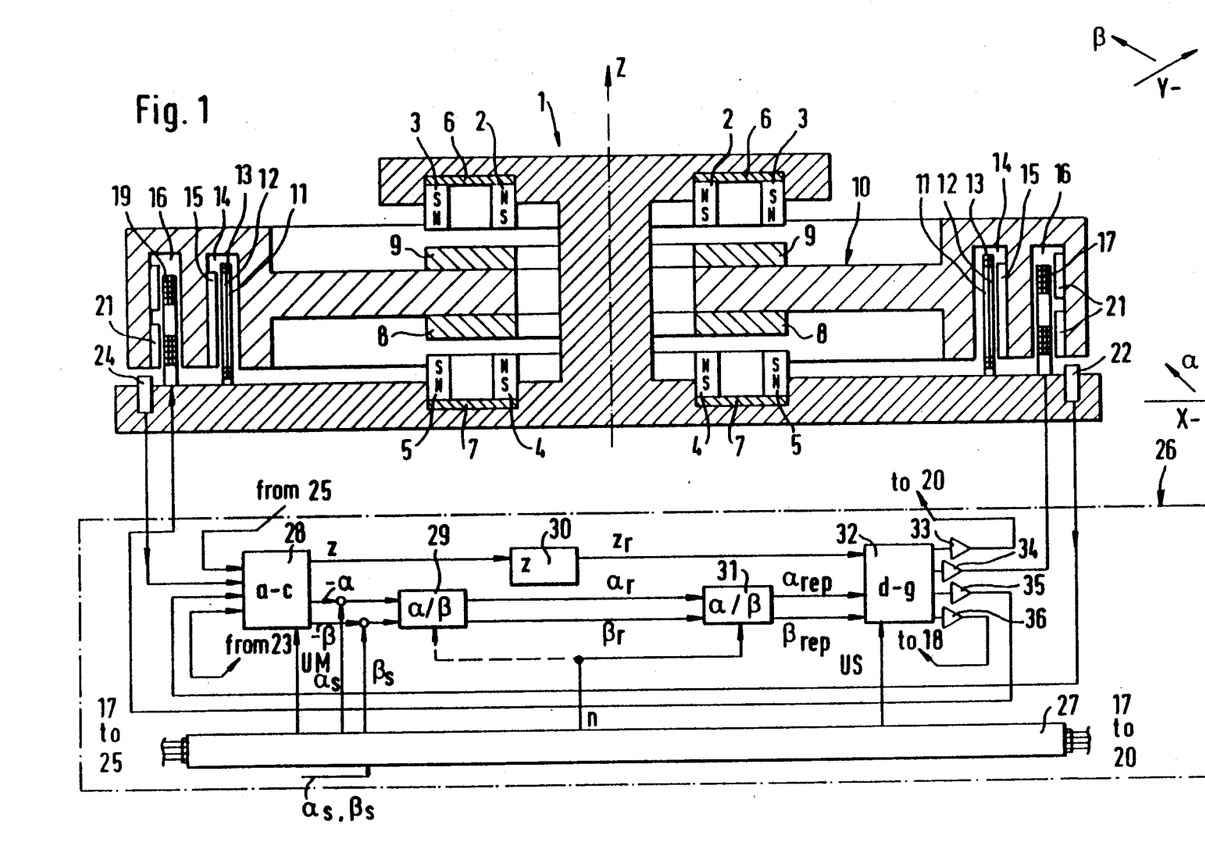
FIG. 1 is a vertical sectional view of the bearing including the regulating and control unit according to the invention.

In FIG. 1, the stator 1 is provided with pairs of axially magnetized permanent magnet rings 2 to 5 in a centrally axially offset arrangement, as well as the associated annular yoke plates 6, 7 of soft-magnetic, highly permeable material. The associated yoke rings 8, 9 are disposed on rotor 10; they are also made of a soft-magnetic, highly permeable material. Permanent magnet rings 2 to 5, together with yoke plates 6, 7 and yoke rings 8, 9, form an axially unstable (in the Z direction), radially stable (in the X and Y directions) passive magnetic bearing. By the selection of suitable relationships between the diameters of the permanent magnet rings 2 to 5 and the spacing of the air gaps the passive tilt resistance is set at zero.

Two annular air gaps 14, 16 are disposed on the outer circumference of rotor 10.

The outer rotor air gap 16 serves to generate axial forces (in the Z direction) and torques (rotating in the direction of $\alpha$ and $\beta$). For this purpose, two oppositely radially magnetized permanent magnet rings 21 are disposed at the outer radius of the rotor air gap 16 to generate a magnetic flux $\phi R$ (see FIG. 2) in the illustrated manner. Four control coils 17 to 20 are provided at stator 1 (see also FIG. 3) and dip into the outer rotor air gap 16 in such a way that they are disposed for the most part in the field of permanent magnet rings 21. Control coils 17 to 20 each extend over 90 degrees of the central outer rotor air gap circumference.

The inner rotor air gap 14 serves to generate axial torques (about the Z axis) and radial forces (in the X and Y directions). For that purpose, a permanent magnet ring 15 which is alternatingly radially magnetized in the circumferential direction is disposed at the outer radius of the inner rotor air gap 14. A damping coil 11 and a motor coil 12 are disposed at stator 1 and dip into the inner rotor air gap 14 in such a manner that only the parts of the coil extending in the Z direction are disposed in the field of permanent magnet ring 15. Components 13, perpendicular to ascending and descending portions of the coils, extend outside the permanent magnets. Coils 11, 12 extend over the entire central inner rotor air gap circumference. Together with permanent magnet ring 15, coil 12 forms an iron-free, electronically commutatable dc motor.

Damping coil 11 is short-circuited and connected in such a way that no decelerating torque is generated when rotor 10 rotates about the Z axis. However, if rotor 10 performs a translatory movement in the X or Y direction, the field of permanent magnet ring 15 induces voltages in damping coil 11 which generates current, and thus, forces that counteract the respective directions of movement. Therefore damping coil 11 together with permanent magnet ring 15 constitutes a passive, radial damping device.

The axial deflection of rotor 10 in the Z direction is detected by four distance sensors 22 to 25 which operate without contact and are spaced at 90 degree intervals on the X and Y axes of stator 1.

By suitably linking the signals from the four distance sensors 22 to 25 in an addition unit 28, the axial deflection z and both tilt angles $\alpha$ and $\beta$ of rotor 10 are obtained in a redundant manner. A switching signal UM is generated as a result of a plausibility check for the four distance sensor signals in an adaptation and monitoring unit 27. The occurrence of a malfunction causes one of the four distance sensors 22 to 25 to be switched to an actual value pickup employing the respectively remaining three distance sensors, with it being necessary to generate the same input signals $\alpha$, $\beta$, z for controllers 29, 30.

The actual axial value z is fed to a proportional-differential controller 30 equipped with a superposed zero power control which generates from it an axial setting signal zr.

Linked with the respective desired values $\alpha_s$, $\beta_s$, the two actual tilt angle values $\alpha$, $\beta$ are fed to proportional-differential tilt controllers 29 which generate from them the signals $\alpha r$ and $\beta r$.

The output signals $\alpha r$ and $\beta r$ of tilt controllers 29 are processed into signals $\alpha rep$ and $\beta rep$ in a decoupling device 31 which cancels out the coupling of tilt axes X, Y of rotor 10 caused by the gyro effects. The parameters for this decoupling device 31 are changed as a function of the number of revolutions n of rotor 10.

Figure 7:
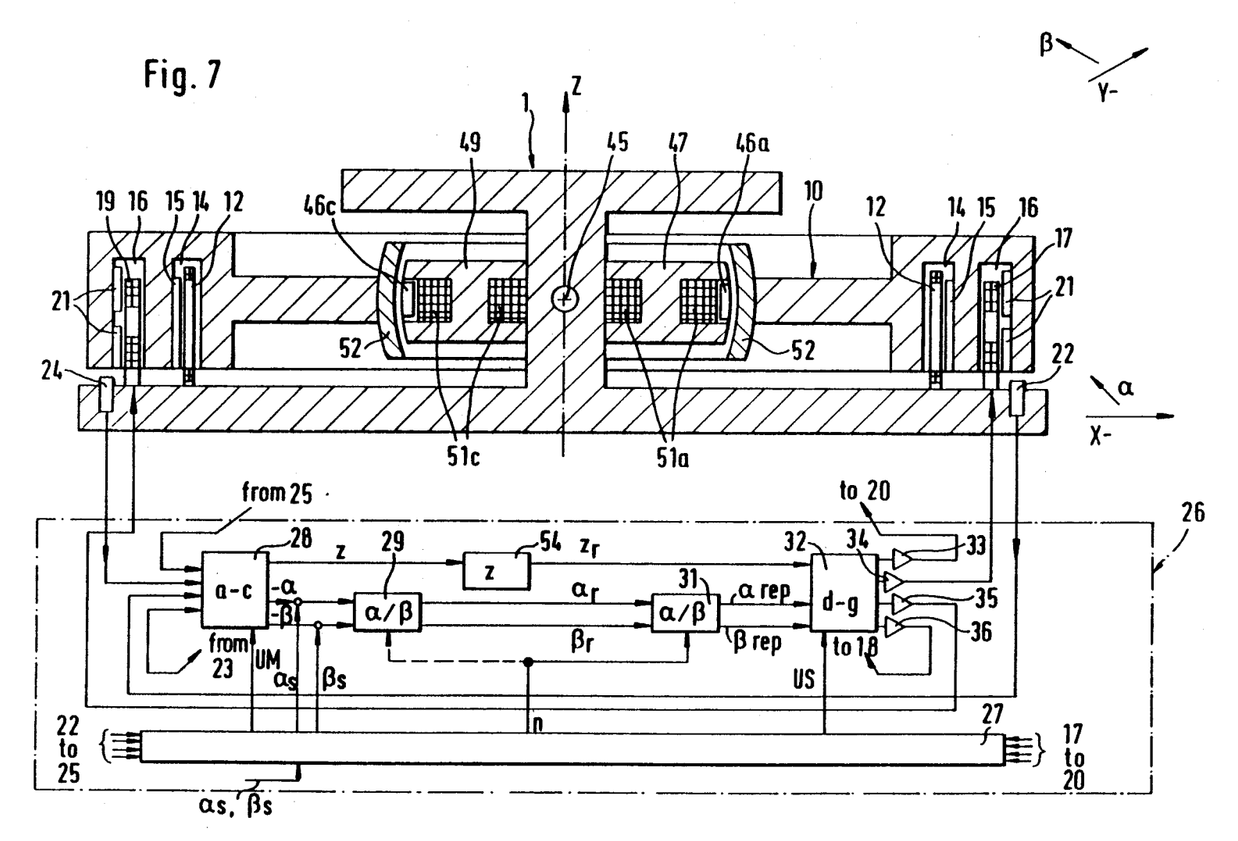
FIG. 7 illustrates a modification of the bearing of FIG. 1 including an active central bearing.

The decoupling may be effected in two different versions. On version requires that the parameters of tilt controllers 29 are independent of the number of revolutions n of rotor 10. In the other version, the parameters of tilt controllers 29 are varied as a function of the number of revolutions n of rotor 10. (FIGS. 1 and 7 show both versions by a dashed line extending from branch point n to tilt controllers 29.)

By suitable linkage in an addition unit 32, redundant desired values are calculated from the three signals zr, $\alpha rep$ and $\beta rep$ for four 90° offset forces that act in the Z direction on the circumference of rotor 10. With the aid of current impressing power amplifiers 33 to 36 which generate currents in control coils 17 to 20, these values are then converted into forces so that the desired axial forces and tilt moments are generated. A switching signal US generated in adaptation and monitoring unit 27 from a plausibility check of the four coil currents is used, in the case of a malfunction in one of the four power amplifiers 33 to 36 or one of the four control coils 17 to 20, to make a switch to a current control employing the three remaining operational power amplifiers and their associated control coils, with the currents after switching having to be of such magnitude that the same tilt moments and the same axial forces, respectively, are exerted on rotor 10. In order to provide for adaptation and monitoring, adaptation and monitoring unit 27 receives the signals of control coils 17 to 20, of distance sensors 22 to 25 and the desired values $\alpha_s$, $\beta_s$.

Figure 2:
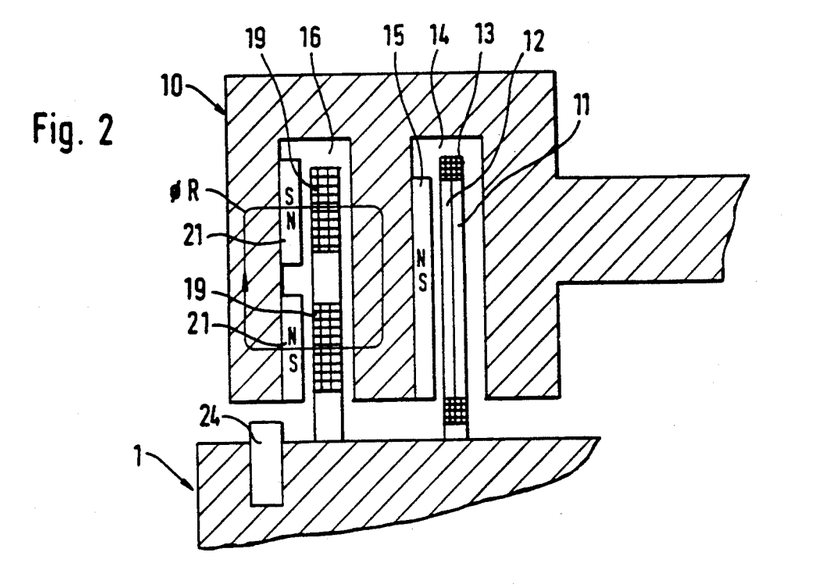
FIG. 2 shows the left-hand portion of the vertical sectional view of the bearing of FIG. 1 in a detail view.

FIG. 2 shows in detail the left portion of the bearing from the vertical sectional view of the bearing of FIG. 1. The two annular rotor air gaps are marked 14 and 16. A damping coil 11 fastened to stator 1 and a motor coil 12 also fastened to stator 1 project into the inner rotor air gap 14. A permanent magnet ring 15 which is alternatingly radially magnetized in the circumferential direction and whose magnetic flux is utilized by damping coil 11 and motor coil 12 is disposed at the outer radius of inner annular rotor air gap 14.

Control coils 17 to 20 are accommodated in the outer annular rotor air gap 16. Two oppositely magnetized permanent magnet rings 21 are disposed at the outer radius of outer rotor air gap 16 and generate a magnetic flux $\phi R$ which penetrates control coils 17 to 20.

Figure 3:
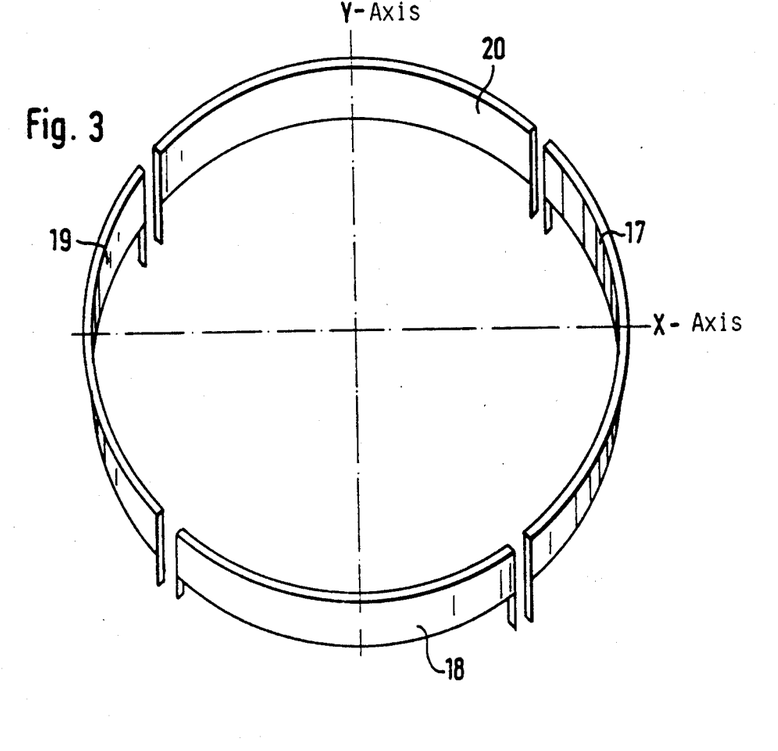
FIG. 3 illustrates the arrangement of the four control coils according to the invention.

FIG. 3 shows the four control coils 17 to 20 which each extend over 90° of the central outer rotor air gap 16 and are fastened to stator 1 in such a manner that control coils 17 and 19 are offset by 180° relative to one another on the X axis (see also FIG. 1) and control coils 18 and 20 are offset 180° relative to one another on the Y axis (see also FIG. 1) of the bearing.

Figure 4:
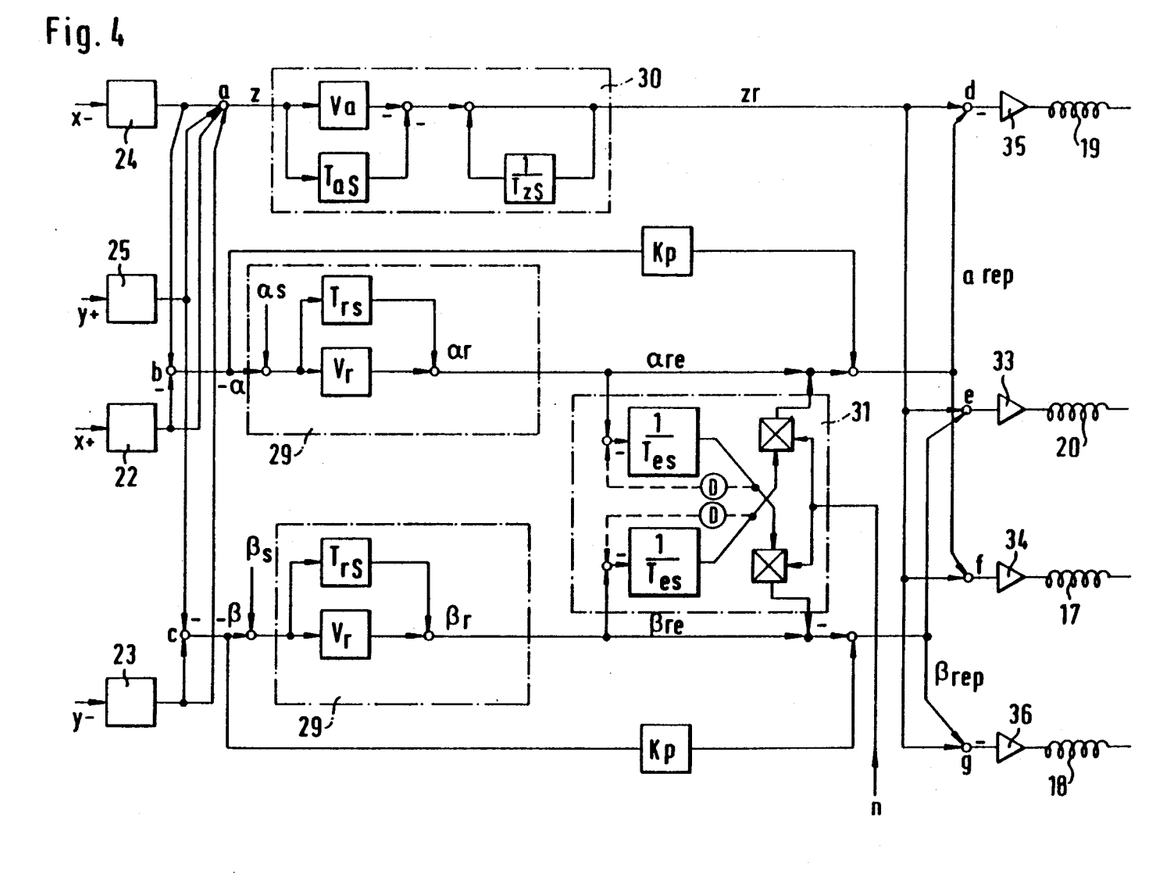
FIG. 4 schematically shows the control principle according to the invention in the form of a block circuit diagram for changes in the tile control parameters not in dependence on the number of revolutions.

FIG. 4 shows the control principle in detail in the form of a block circuit diagram involving a change in the tilt control parameters not dependent on the number of revolutions. The signals from distance sensors 22 to 25, when added, provide the axial deflection z. The signal of distance sensor 24 minus the signal of distance sensor 22 provides the negative tilt angle $\alpha$ (addition point b) and the signal of distance sensor 23 minus the signal of distance sensor 25 provides the negative tilt angle $\beta$ (addition point c).

The signals of distance sensors 22 to 25 are added (addition point a) and are processed as axial deflection z in proportional-differential controller 30 equipped with additional zero-power control to yield the output signal zr which is fed simultaneously to all four power amplifiers 33 to 36 whose output signals are fed to control coils 17 to 20. The control deviations of the $\alpha$ and $\beta$ swings are processed by proportional-differential controllers 29 together with the parameters $V_r$ (overall controller gain) and $T_r$ (overall controller time constant) to yield signals $\alpha r$ and $\beta r$.

The output signals of tilt controllers 29, signals $\alpha r$ and $\beta r$, are linked with one another by an integral alternating forward coupling whose time constant $T_n$ is regulated in inverse proportion to the number of revolutions so as to cancel the coupling of tilt axes X and Y of rotor 10 caused by the gyro effects. Thus nutation vibrations are prevented; $T_n = T_e/2\pi n$.

The integration time constant $T_e$ of decoupling device 31 is the ratio of axial to tile inertial moments of rotor 10. If a passive tilt attenuation exists in the central bearing (1 to 10), this may be considered by way of the factor D.

The passive tilt moment of the central bearing (1 to 10) is neutralized, if present, by the factor Kp which derives a corresponding countermoment from the tilt deflection. Thus precessional oscillation is prevented. A nonlinear tilt moment characteristic may be compensated by an inverse characteristic $K_p = f(\alpha)$ and $K_p = f(\beta)$, respectively.

By way of addition points d, f and e, g, signals $\alpha_{rep}$ and $\beta_{rep}$ are fed to the respective power amplifiers 34, 35; 33, 36 and to control coils 17, 19; 18, 20.

Figure 5:
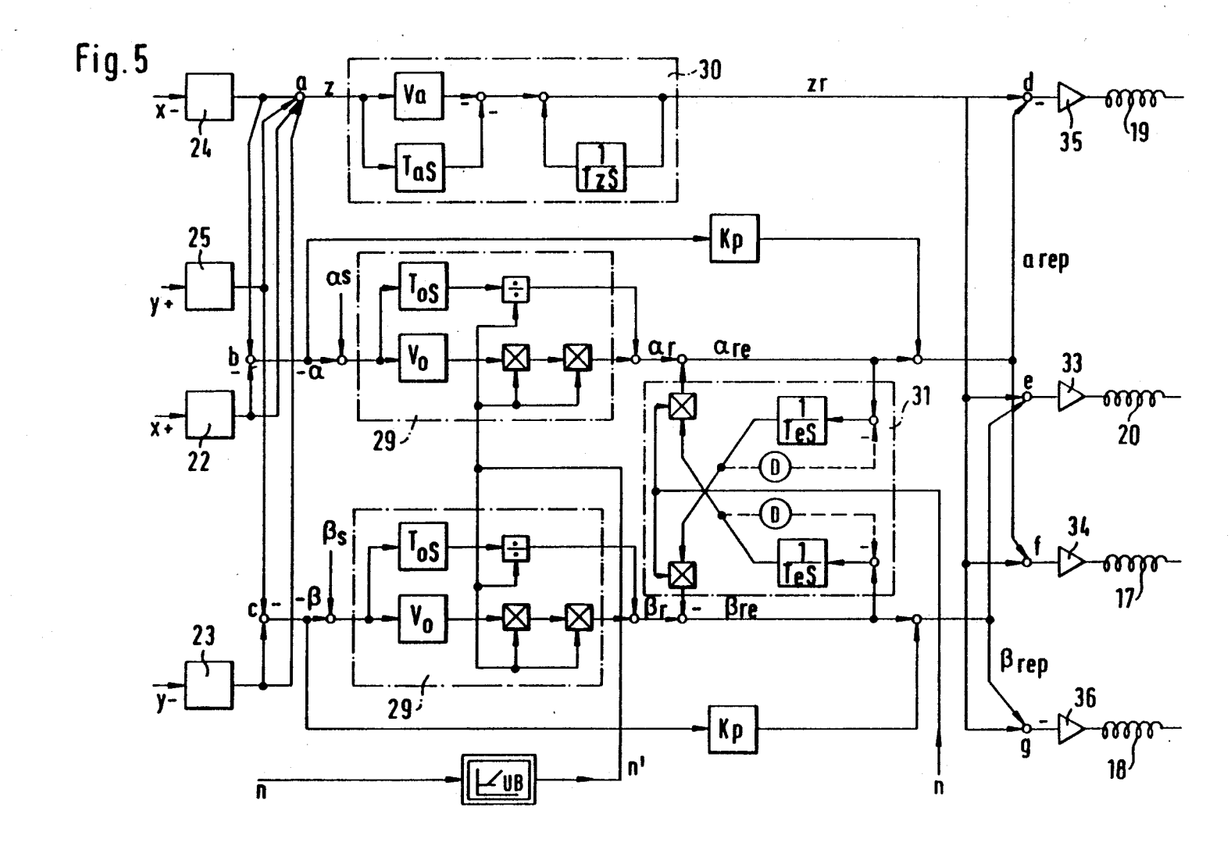
FIG. 5 schematically shows a modificaiton of the control principle of FIG. 4 in the form of a block circuit diagram for changes in the tilt control parameters as a function of the number of revolutions.

FIG. 5 shows the detailed control principle of a modified embodiment in the form of a block circuit diagram involving a change in the tilt control parameters as a function of the number of revolutions. The control principle of FIG. 5 differs from the controller principle of FIG. 4 only in the region of controllers 29 and decoupling device 31 so that only the differences to FIG. 4 are discussed here.

The control deviations of the $\alpha$ and $\beta$ swings are now processed by adaptive proportional-differential controllers 29 into signals $\alpha r$ and $\beta r$. The gain $V_r = V_0 \cdot n^2$ of these tilt controllers is changed in proportion to the square of the number of revolutions n. The time constant $T_r = T_0/n$ of tilt controllers 29 is adjusted in inverse proportion to the number of revolutions n. Thus tilt controllers 29 are now adapted to the characteristics of the now reverse decoupled tilt control paths which change with the number of revolutions n.

The tilt control adaptation is discontinued below a minimum number of revolutions UB; the parameters remain constant in this range, $V_r = V_0$; $T_r = T_0$.

The output signals or and $\beta r$ of tilt controllers 29 are linked together by means of an integral alternating rearward coupling whose time constant $T_n$ is adjusted in inverse proportion to the number of revolutions, thus cancelling the coupling of tilt axes X and Y of rotor 10 caused by the gyro effects. Thus nutational oscillation is prevented; $T_n = T_e/2\pi n$. The integration time constant $T_e$ of decoupling device 31 is again the ratio of axial to tilt inertial moment of rotor 10. If a passive tilt attenuation exists in the central bearing (1 to 10), this may be considered by the factor D. A small portion of D, however, must always be provided in the decoupling system in order to avoid a permanent oscillation.

Figure 6:
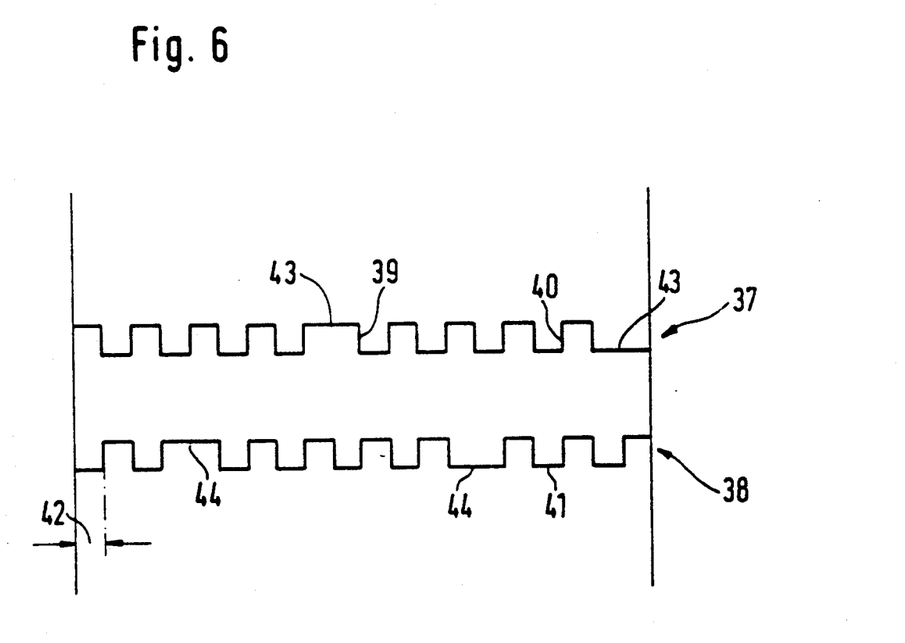
FIG. 6 is an embodiment of a damping coil according to the invention.

FIG. 6 shows an embodiment of a damping coil 11 in a developed view extending over 360°. In this embodiment, the reference numerals 37 and 38 identify two independent, meander shaped wires. Damping coil 11 may also be formed of any other integral multiple of wires.

The ascending and descending components 40, 39 of the meander are oriented parallel to the axis of the rotor and are arranged essentially opposite the alternating permanent magnets of permanent magnet ring 15. The meander components 41 perpendicular thereto extend axially offset outside of the permanent magnets. The width 42 of a meander corresponds to the pole width of a magnet of permanent magnet ring 15.

Two 180° offset meanders of a double width 43, 44 are provided for each wire 37, 38 on the 360° circumference of damping coil 11 and are additionally offset by 90° from wire 37 to wire 38. In this way it is accomplished that the meanders from 0° to 180° and from 180° to 360°, in the case of wire 37, and from 90° to 270° and from 270° to 90°, in the case of wire 38, respectively, face different magnetic poles. In this way it is accomplished that damping coil 11 does not generate a decelerating moment upon rotation of rotor 10 but does generate a decelerating force if rotor 10 performs translatory movements.

FIG. 7 shows a modification of the bearing of FIG. 1 including an active central bearing.

The stator is marked 1, the rotor 10 and the control and regulating unit is marked 26.

Stator 1 is provided with a central active radial bearing 1, 10, 45 to 52, which is accommodated in a spherically symmetrical, tub shaped body 52 of a soft-magnetic material which serves as magnetic yoke and is fastened to rotor 10. The tub shaped body 52 has the center of gravity 45 of rotor 10 as its center.

At the outer circumference of stator 1, opposite the magnetic yoke 52 of rotor 10, four electrodes 46a to 46d are provided on the X axis and on the Y axis, offset by 90° in each case. Together with rotor 10 and yoke irons 47 to 50 these electrodes form capacitive distance sensors. Yoke irons 47 to 50 here serve as transmitting electrodes, rotor 10 as a reflection electrode and electrodes 46a to 46d as receiving electrodes.

Also disposed on the X and Y axis are four coils 51a to 51d which are each offset by 90°. Yoke irons 47 to 50, coils 51a to 51d and the spherically symmetrical, tub shaped body 52 form four 90° offset, magnetically separated electromagnet segments which can be activated in oppositely disposed pairs and independently of one another. The magnetic separation may be realized, for example, in that the electromagnet segments are separated from one another by air gaps 55 (FIG. 8) and the bearing mandrel 56 (FIG. 8) is manufactured from a low permeability material.

A radial movement of rotor 10 relative to stator 1 along the X and/or Y axis is picked up by capacitive sensors (formed by 10, 46a to 46d, 47 to 50) and is set back by electromagnet segments (formed by 47 to 50, 51a to 51d, 52). It is of course also possible to employ inductive sen optical sensors or sensors based on another measuring principle.

Figure 8:
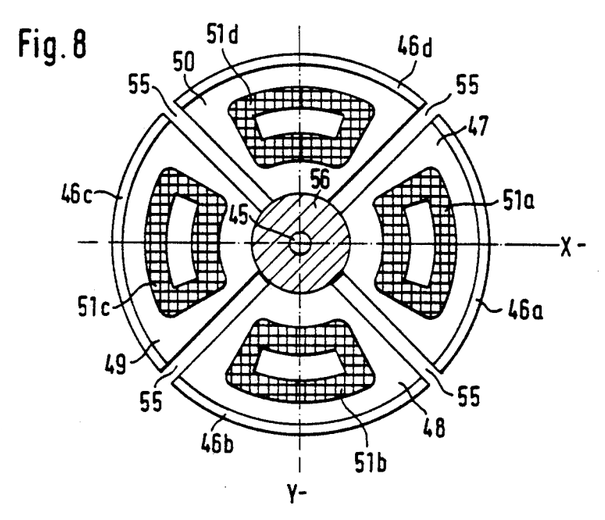
FIG. 8 is a horizontal sectional view of the active central bearing of FIG. 7.

FIG. 8 is a horizontal sectional view of the active radial central bearing. The stationary portion of the central bearing attached to stator 1 is composed of four 90° electromagnet yoke iron segments 47 to 50 that are magnetically separated from one another, for example, by air gaps 55, and include coils 51a to 51d as well as tub shaped body 52 (FIG. 7) which is disposed in the center of rotor 10 and is composed of soft-magnetic material to serve as the magnetic yoke. Electromagnet segments 47, 51a, 52; 49, 51c, 52; 48, 51b, 52; 50, 51d, 52, as well as electrodes 46a to 46d are arranged symmetrically in the X and Y axes, with the center of gravity 45 forming the center. In order to provide magnetic separation, bearing mandrel 56 is made of a low permeability material, for example, aluminum.

Figure 9:
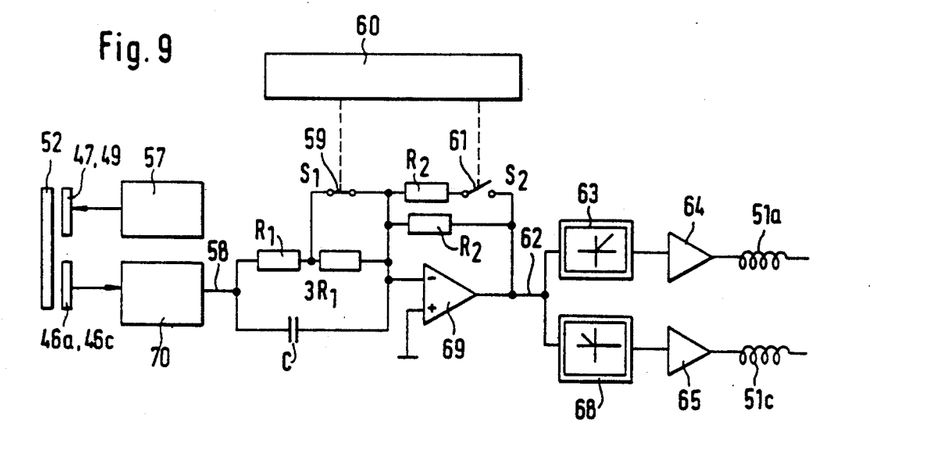
FIG. 9 is a schematic circuit diagram, according to the invention, regulating principle for an axis of the active radial central bearing.

FIG. 9 shows the control principle for one axis of the active radial central bearing. Yoke irons 47, 49 are excited by an oscillator 57. The capacitive sensors (46a, 46c, 47, 49, 52) pick up a radial change in position of rotor 10 relative to stator 1 and interpret it as a change in capacitance which is fed to an electronic sensor evaluation system 70.

The output signal of electronic sensor evaluation system 70 is fed as the actual position value 58 from sensor pair 46a, 46c to an input circuit (C, R$_1$, 3R$_1$, S$_1$) of a proportional-differential proportional-differential controller 69 may be switched by a higher order monitoring and control unit 60 between "soft" and "hard" control. This is of advantage if strong radial interference is expected—in which case a "hard" control behavior is preferred—or if interference due to imbalance is to be transferred to the stator to the lowest possible degree—in which case a "soft" control behavior is preferred. The "hard" control behavior is realized in that switch S$_1$ is closed and switch S$_2$ is opened. The "soft" control behavior is realized in that switch S$_1$ is opened and switch S$_2$ is closed. The output signal of proportional-differential controller 69 is converted alternatingly in coil 51a or in coil 51c by way of current impressing power amplifiers 64, 65 into radial forces on rotor 10.

I claim:

1. A bearing for radially and axially supporting a rotor having large radial dimensions about a stator having X, Y and Z axes, with the rotor being stabilized about the axes of the stator, said bearing comprising:
   sensing means, associated with the X and Y axes of the stator, for determining angles of tile of the rotor with respect to the stator's X and Y axes, said sensing means outputting signals representing the determined tilt angles;
   control coils disposed on the stator and associated with the X and Y axes of the stator;
   control means, connected to the outputs of the sensing means, for generating control currents in said control coils to produce moments which act on the rotor influencing the determined tilt angles, said control means having alternating coupling means receiving signals representing the determined tilt angles for cancelling the coupling of X and Y tilt axes of the rotor caused by gyroscopic effects, said alternating coupling means having integral characteristics with time constants which are inversely proportional to the number of revolutions of the rotor.

2. A bearing according to claim 1, wherein the moments generated by the control coils are axial and tilt inertial moments of the rotor, and an integration time constant T$_e$ of the alternating coupling means is proportional to the ratio of axial moment to tile inertial moment of the rotor.

3. A bearing according to claim 1, wherein the control means further comprise proportional-differential controllers (PD controllers) and the signals fed in via the alternating coupling means are processed into signals which are added to the output signals of the PD controllers or are subtracted from them, respectively, and the input signals of the alternating coupling means are the output signals of the PD controllers.

4. A bearing according to claim 1, wherein the control means further comprise PD controllers having a gain which changes in proportion to the square of the number of revolutions n of the rotor, and a time constant T$_r$ which changes in inverse proportion to the number of revolutions n of the rotor; and, up to a given minimum number of revolutions, the PD controllers have a constant gain VO and a constant time constant TO and become dependent on the number of revolutions only above this minimum number of revolutions.

5. A bearing according to claim 4, wherein the signals carried through the alternating coupling means are added to the output signals of the PD controllers or subtracted from them, respectively, and the input signals of the alternating coupling means are the output signals of the signals resulting from the addition or subtraction, respectively.

6. A bearing according to claim 1, wherein the sensing means includes distance sensors and each axis X, Y has two associated, oppositely connected distance sensors.

7. A bearing according to claim 1, wherein each axis X, Y has two associated control coils which are disposed on the stator.

8. A bearing according to claim 7, further comprising two axially mutually offset permanent magnet rings of different polarities disposed on the rotor, said permanent magnet rings being opposed by the four control coils which are distributed uniformly over the circumference of the stator, with each pair of facing control coils being connected with said control means in such a manner that they exert a restoring moment on the rotor if it is tilted.

9. A bearing according to claim 1, further comprising, parallel to the axis of rotation, a plurality of permanent magnets arranged on the rotor, with mutually adjacent permanent magnets having different polarities; and at least a two-phase motor coil disposed on the stator opposite these permanent magnets.

10. A bearing according to claim 9, wherein each phase of the motor coil is formed of a wire having a meander shape, with ascending and descending portions of the meander being oriented parallel to the rotor axis and lying essentially opposite the permanent magnets, while components of the motor coil perpendicular to the ascending and descending portions extend outside the permanent magnets in an axially offset arrangement, with the width of the meander corresponding to the pole pitch.

11. A bearing according to claim 1, further comprising, parallel to the axis of rotation, a plurality of permanent magnets arranged on the rotor, with mutually adjacent permanent magnets having different polarities; and at least one damping coil, formed of at least two independent wires having a meander shape, arranged opposite the permanent magnets, with ascending and descending components of the meander shape being oriented parallel to the rotation axis and lying essentially opposite the permanent magnets while damping coil components perpendicular thereto extend outside of the permanent magnets with an axial offset, wherein the width of the meander shape corresponds to one pole pitch and some of said wires are arranged at such an offset that rotation of the rotor does not generate a decelerating moment therein, but translatory movements of the rotor generate a damping force for this movement.

12. A bearing according to claim 10, further comprising at least one damping coil, wherein the motor coil and the damping coil face the jointly employed permanent magnets.

13. A bearing according to claim 1, wherein the bearing is formed by at least one magnetic bearing 14. A bearing according to claim 13, wherein the bearing is formed by a passive magnetic bearing.

15. A bearing according to claim 13, wherein the sensing means output signals indicating a sensed axial displacement of the rotor and the signals are fed in parallel via a PD controller of the control means to the control coils provided for tilt control.

16. A bearing according to claim 15, wherein the sensing means includes two pairs of distance sensors, disposed along the X and Y axes of the stator, respectively; and if pairs of distance sensors associated with axes X, Y are employed to pick up the tilt angle, said pairs of distance sensors are also employed as sensors for the axial displacement control.

17. A bearing according to claim 13, wherein the signals of the sensing means representing the determined tilt angles are provided wtih a factor Kp and are superposed on signals generating control currents in the respective control coils.

18. A bearing according to claim 13, wherein the integral alternating coupling signals of the alternating coupling which are independent of the number of revolutions n of the rotor are provided with a factor D and returned to the input of the associated coupling signals.

19. A bearing according to claim 8, wherein the control coils and the permanent magnet rings for generating the tile moment are attached to the outer circumference of the rotor.

20. A bearing according to claim 1, further comprising an adaptation and monitoring unit connected to said control means, and wherein the sensing means includes four distance sensors disposed on the stator and outputting control signals, the four distance sensors being linked so that the linkage of the four distance sensor signals can be switched by way of the adaptation and monitoring unit, and if one of said four distance sensors malfunctions, the remaining three operational distance sensors as determined by the adaptation and monitoring unit form the same input signals for the controllers of the control means.

21. A bearing according to claim 20, wherein the control means further comprises four power amplifiers, connected to the output of the controllers, for sensing signals generating the control coil currents; and the linkage of the control signals obtained from the sensor signals can be switched by means of the adaptation and monitoring unit so that, if one of the four power amplifiers and/or control coils is malfunctioning, the three remaining operational power amplifiers and their associated control coils as determined by the adaptation and monitoring unit generate the same axial forces and exert the same moments on the rotor.

22. A bearing according to claim 13, wherein the rotor is supported at the stator by means of an active central bearing comprising yoke irons and a magnetic yoke, and said sensing means includes sensors disposed on the stator, at least two of the sensors associated wtih the X and Y axes sensing the radial position of the rotor and feeding their output signals via power amplifiers to only one coil arranged in each axis so as to form a magnetic field to regulate rotor positions which radially deviate from the center of the bearing.

23. A bearing according to claim 22, wherein the magnetic yoke of the rotor has a tub shape.

24. A bearing according to claim 22, wherein the coils are disposed in mutually, magnetically separated sectors of 90°.

25. A bearing according to claim 1, wherein said sensing means includes a plurality of sensors disposed on the stator and associated with X and Y axes of the stator, said sensors being capacitive sensors.

26. A bearing according to claim 1, wherein the control means further includes a controller and the gain and time constant parameters of the controller are switchable.

* * * * *